Nov. 21, 1967         V. KINSER         3,353,828
SWINGABLE HORSESHOE STAKE WITH SHOCK ABSORBING MEANS
Filed Feb. 11, 1965
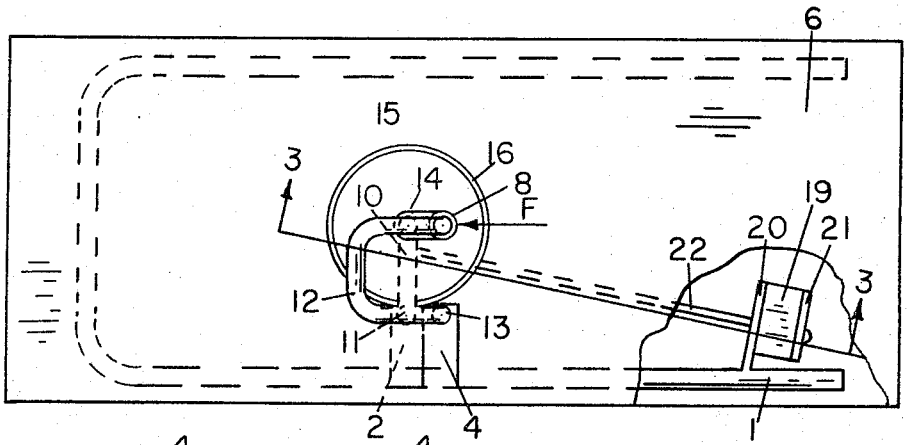
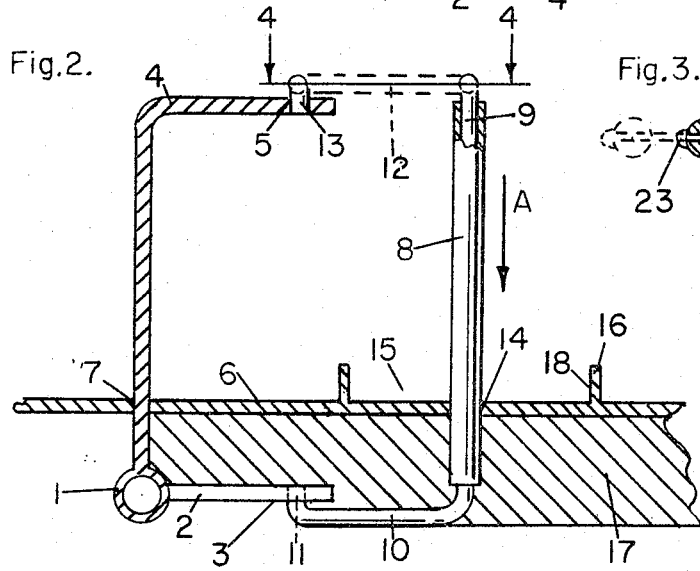
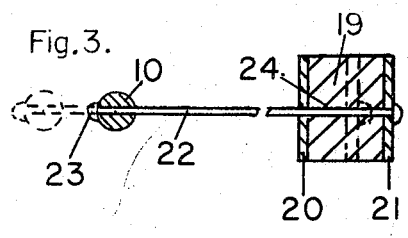
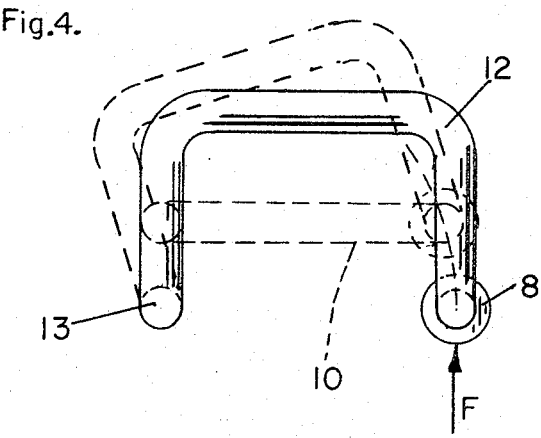
INVENTOR
Vernon Kinser United States Patent Office 3,353,828
Patented Nov. 21, 1967

3,353,828
SWINGABLE HORSESHOE STAKE WITH
SHOCK ABSORBING MEANS
Vernon Kinser, 11103 Goethe, Detroit, Mich. 48214
Filed Feb. 11, 1965, Ser. No. 431,817
9 Claims. (Cl. 273—104)

ABSTRACT OF THE DISCLOSURE

A horseshoe pitching court having a frame, a horseshoe-receiving stake mounted upon said frame and swingable in a vertical plane, with shock absorbing means connected to said stake and said frame; there being a resilient pad covering the base portion of said frame and the lower end of said stake, a mat presented upon said resilient pad and incorporating a container-defining portion disposed about the stake for receiving horseshoes.

This invention relates generally to an improvement in horseshoe pitching courts for use in the game of horseshoe pitching.

More specifically my invention relates to courts for the well-known form of the horseshoe pitching game, which, in its present simplest form, is played by pitching or throwing horseshoes at a stake as a target some distance from the player. Usually the stake is rigidly supported and as a result the impact of a pitched horseshoe against the stake makes undesirable noise and the horseshoes often bounce off the stake or, in time, break.

My present invention has hence for its prime object the provision of horseshoe pitching courts having more properly supported stakes and providing an improved cushion supported mat with a retainer pocket to retain the horseshoes in place once they have been pitched around the stake.

And with the above and other objects in view, my invention resides in the novel features of form, construction, arrangement, and combination of parts presently described and pointed out in the claims.

In the accompanying drawings (one sheet)—

FIGURE 1 is an elevated top view of a horseshoe pitching court of my invention;

FIGURE 2 is a sectional view taken approximately through the stake-tube 8 and trunnions 11, 13;

FIGURE 3 is a sectional view taken approximately along line 3—3 FIGURE 1;

And FIGURE 4 is a sectional view taken approximately along line 4—4 FIGURE 2.

Referring now more in detail and by reference characters to the drawings, which illustrate practical embodiments of my invention, frame 1 (made of tubing) is provided with arm 2 which, in turn, is provided with a hole 3. Another arm 4 is included by frame 1, but it extends upwardly through the hole 7 in mat 6 and its upper end arm 4 is provided with hole 5 which is in axial alignment with hole 3 for purposes to appear later.

Carriage means is provided for the stake-tube 8, for which purpose stake-tube 8 embraces the shaft 9 which at one end of the stake-tube 8 forms a radially extending arm 10 at the extreme end of which is formed a trunnion 11 for cooperation with hole 3 for swingable association therewith. The stake-tube 8 extends upwardly through the hole 14 in mat 6 and at its other end the shaft 9 is similarly formed into a radially extending, through U shaped, arm 12 and a trunnion 13 for cooperation with hole 5 for swingable association therewith.

A pocket 15 is formed by the mat 6, for which purpose the mat 6 has a circumferentially disposed rim 16 extending vertically from its surface so that once a horseshoe (not shown) has made contact with the stake it will slide along in the direction of arrow A until it comes in compressive contact with the mat 6, the sponge 17 will absorb the shock from the mat 6 and the horseshoe will come to rest retained by the sidewalls 18 provided by rim 16.

Horseshoe pitching is always done with the stake leaning toward the pitcher. Therefore, all pitching will be done at the stake-tube 8 in the direction of the arrow F, and the momentum of the horseshoes as they strike the stake-tube 8, will cause it to swing upon the axis of the trunnions 11, 13, since the carriage means is not disposed to support the stake-tube 8 in the direction of arrow F.

Momentum of the horseshoes thus transmitted to the stake-tube 8 is absorbed by the sponge 19. For which purpose the sponge 19 is placed for compression between the pressure plates 20, 21, pressure plate 20 is stationary as an integral part of frame 1 and pressure plate 21 is connected to stake-tube 8 by means of a rivet type rod 22 which has heads 23 and extends through holes 24 in arm 10, pressure plates 20, 21, and sponge 19, connected so that movement of the stake-tube 8 in the direction of the arrow F must compress the sponge 19 whereby to effectively control movement of stake-tube 8 in the direction of arrow F.

In use and operation it will be seen that my horseshoe pitchers courts effects their purpose. The stake-tube 8 is very properly supported, it is supported on both ends by a carriage which is highly adapted for its purpose and connected to the sponge 19 in such a manner as to very effectively absorb any impact or momentum that may be transmitted to the stake-tube 8. Furthermore, the pocket 15 will serve to very effectively retain any horseshoe once it has found its target and the U shaped arm 12 gives added clearance to any horseshoe as it approaches the stake-tube 8.

It will be understood that, if desired, various changes and modifications in the form, construction, arrangement and combination of the several parts of one of my horseshoe pitching courts may be made and substituted for those herein shown and described without departing from the nature and principles of my invention.

Having thus described my invention what I claim and desire to secure by Letters Patent is:

1. A horseshoe pitching court comprising a frame, a stake, means swingably mounting said stake to said frame, portions of said mounting means being swingable with said stake, and shock absorbing means connected at one end to said frame and at the other end to a swingable portion of said mounting means.

2. A horseshoe pitching court as defined in claim 1 and further characterized by said mounting means comprising upper and lower arms extending from the related ends of said stake, said arms being swingable engaged in vertically spaced relationship upon said frame, and said shock absorbing means comprising a plate connected to said frame and an elongated member connected to said lower arm.

3. A horseshoe pitching court as defined in claim 2 and further characterized by said shock absorbing means plate having an opening, and said elongated member passing therethrough for movement relative thereto upon swinging of said mounting means.

4. A horseshoe pitching court as defined in claim 1 and further characterized by said shock absorbing means comprising a first plate integrally mounted to said frame and having an aperture therein, a second plate, and a rod extending through said aperture in said first plate, one end of said rod being connected to said second plate, resilient means disposed between said first and second plates for compression therebetween upon movement of said rod responsive to swinging of said mounting means.

5. A horseshoe pitching court as defined in claim 1 and further characterized by said frame comprising a horizontal portion and a vertical extension, a resilient pad covering said horizontal portion of said frame and the lower end portion of said vertical extension.

6. A horseshoe pitching court as defined in claim 5 and further characterized by a mat disposed over said pad.

7. A horseshoe pitching court as defined in claim 5 and further characterized by a mat disposed over said pad, and means defining a container formed integrally upon the upper face of said mat and disposed about said stake for receiving horseshoes pitched thereagainst.

8. A horseshoe pitching court as defined in claim 1 and further characterized by said stake comprising a tubular member having a longitudinal bore, and a shaft received within said bore and projecting at its ends therebeyond, said mounting means comprising upper and lower horizontally disposed arms extending from the respective ends of said shaft, a trunnion provided on the free end of said upper and lower arms, and trunnion-receiving means provided on said frame for a swingable movement of said stake.

9. A horseshoe pitching court comprising a frame; a stake; means swingable mounting said stake to said frame; shock absorbing means connected at one end to said frame and at the other end to said mounting means; a resilient pad covering said frame and the bottom portion of the stake; and a mat disposed over said pad and carrying container means, disposed about the base of the stake where it protrudes through the mat, for receiving horseshoes.

References Cited

UNITED STATES PATENTS 1,035,658    8/1912    Talbert et al.
1,929,922    10/1933    Hassenplug _____ 273—100

ANTON O. OECHSLE, *Primary Examiner.*

RICHARD C. PINKHAM, *Examiner.*

M. R. PAGE, *Assistant Examiner.*